United States Patent

Weeks et al.

[11] Patent Number: 6,119,008
[45] Date of Patent: Sep. 12, 2000

[54] FLEXIBLE MULTIPLE SUBSCRIBER RADIO ACCESS SYSTEM

[75] Inventors: David P. Weeks, Torquay; John D. McNicol, Kingswear; Jie Lin, Torquay; Keith Russell Edwards, Paignton; Richard Driscoll, Totnes, all of United Kingdom

[73] Assignee: Northern Telecom Limited, Montreal, Canada

[21] Appl. No.: 08/961,198

[22] Filed: Oct. 30, 1997

[51] Int. Cl.$^7$ ...................................................... H04Q 7/28
[52] U.S. Cl. .......................... 455/445; 455/403; 455/463; 455/557; 455/507
[58] Field of Search ..................................... 455/403, 445, 455/462, 463, 464, 507, 554, 560, 561; 370/420, 421, 522, 338, 362, 336, 337, 328, 343

[56] References Cited

U.S. PATENT DOCUMENTS

| 5,123,043 | 6/1992 | Higashiyama et al. | 455/463 |
| 5,544,227 | 8/1996 | Blust et al. | 455/445 X |
| 5,666,398 | 9/1997 | Schiffel et al. | 455/403 X |
| 5,764,730 | 6/1998 | Rabe et al. | 455/304 |
| 5,802,177 | 9/1998 | Daniel et al. | 455/403 X |

FOREIGN PATENT DOCUMENTS

| 0 595 392 | 5/1994 | European Pat. Off. . |
| 0 766 427 | 4/1997 | European Pat. Off. . |
| 0 771 127 | 5/1997 | European Pat. Off. . |
| 0 777 397 | 6/1997 | European Pat. Off. . |
| 0 777 398 | 6/1997 | European Pat. Off. . |
| 2 181 639 | 10/1989 | United Kingdom . |
| WO 96/16520 | 5/1996 | WIPO . |
| WO 96/28946 | 9/1996 | WIPO . |
| WO 96/38966 | 12/1996 | WIPO . |
| WO 96/38990 | 12/1996 | WIPO . |

*Primary Examiner*—Wellington Chin
*Assistant Examiner*—Yemane Woldetatios
*Attorney, Agent, or Firm*—Young & Thompson

[57] ABSTRACT

A radio access system comprises a base station and a plurality of subscriber locations. The subscriber locations each comprise a residential base unit or subscriber interface which includes line termination equipment. A group of subscribers is served by a pool of residential radio transceiver units in radio communication with the base station which is connected to the residential base units by a shared bus. A group of subscriber locations may be served by a lesser number of residential transceiver units, while at the same time providing individual locations with access to increased bandwidth for ISDN services and the like. Also described is a system in which a subscriber's base unit is connected to two or more residential transceiver units to allow increased bandwidth without requiring additional residential base units.

34 Claims, 2 Drawing Sheets

FLEXIBLE MULTIPLE SUBSCRIBER RADIO ACCESS SYSTEM

FIELD OF THE INVENTION

This invention relates to a flexible multiple subscriber radio access system and in particular to such a system in which a plurality of subscribers are served by a remote base station via respective radio communication channels.

BACKGROUND TO THE INVENTION

In existing proposals for a fixed radio access system, each subscriber premises is provided with a residential service system which includes a residential transceiver unit and a residential base unit. The residential transceiver unit establishes and controls one or more radio communication channels with the remote base station, with a typical transceiver unit being capable of providing three 32 kbit/s channels. The radio transceiver unit also handles the air side allocation of resources. The residential base unit may be a subscriber line interface card and typically includes a multiplexer and network termination equipment to provide the subscriber with typically up to two PSTN lines and an S/T interface for ISDN. It is emphasised that the residential base unit and the residential transceiver unit may be arranged together as an integral unit, or the components of the unit may be distributed. Accordingly the residential baseband unit and network termination equipment may be either collocated, or separate, connected by a suitable communications channel employing for example ITU-TREC 1-430 (S-Bus) technology.

Although this system works well, providing reliable and relatively economic installation and operation, the system lacks flexibility in some aspects and this can affect ease of installation and operation of the network, with a consequent effect on capital and recurring costs. The available bandwidth that can be delivered to a given subscriber is limited to that available through one residential transceiver unit. The bandwidth of 96 kbit/s (3×32 kbit/s channels) available from a typical residential transceiver unit would be sufficient to provide a subscriber with up to three voice calls at 32 kbit/s ADPCM but is not enough to provide a subscriber with 2B+D ISDN basic rate which requires a bandwidth of 144 kbit/s. It has been proposed to provide a subscriber with a further residential subscriber system but this increases installation and equipment costs. Similar considerations apply to broadband broadcast services. Further, increasing residential subscriber system capacity on a per subscriber basis results in poor utilisation of available bandwidth and provides very limited or no concentration of series between the subscriber installation and the residential transceiver units. In addition there is no redundancy in the event of residential subscriber system failure, power loss or radio link.

SUMMARY OF THE INVENTION

The invention seeks to provide a flexible multiple subscriber radio access telecommunication system which provides enhanced levels of service to the subscribers and additional useful features to the network operator whilst maintaining equipment, installation and running costs at low levels.

Accordingly in one aspect of this invention there is provided a radio access system for establishing radio communication between a base station and a plurality of subscriber locations, said base station including a base transceiver for providing a plurality of radio communication links between said base station and respective subscriber locations, and a backhaul for passing signals between said base station and a telecommunications network;

a group of one or more subscriber transceivers of given capacity associated with said group of subscriber locations;

a respective interface device associated with each subscriber location and including line termination equipment, and a data bus connecting the or each said subscriber transceiver with each subscriber interface device.

Although the system provides benefits where multiple subscribers share a single subscriber transceiver, it is preferred for a plurality of subscriber transceivers to serve said group.

In this arrangement, the data bus provides a shared bus communications medium between the subscriber interface devices and the subscriber transceivers associated with that group of subscribers. The shared bus thus makes a pool of subscriber transceivers available to any given subscriber interface device, and any given subscriber transceiver can service multiple subscriber interface devices, provided the transceiver has sufficient bandwidth available.

This system allows concentration of services between the subscriber installations and the subscriber transceivers, and enables an efficient utilisation of bandwidth resources at both the subscriber interface and the transceiver ends. It also allows high bandwidth services such as ISDN to be introduced in a cost effective manner. The system may also provide additional benefits in terms of redundancy in the event of failure of a transceiver or other problems such as power loss or radio link problems.

Although the system has application broadly, it is primarily intended for fixed radio access systems, where the subscriber locations are fixed e.g. in a domestic or commercial premises and served by a base station serving a plurality of subscribers in the locality. In particular, it is specially useful for multiple occupancy premises such as apartment blocks or offices where the subscribers are close together so that any cabling or other medium for the shared bus and connections with the subscriber interface devices and the subscriber transceivers can be installed relatively easily.

The data bus may take many forms, for example electrical cable, optical or radio, but it is preferred for it to be an electrical cable bus. Various types may be used but S-Bus technology is preferred. In a particularly preferred arrangement each subscriber transceiver is connected in master configuration to a respective S-Bus and the subscriber interface devices are connected as slaves.

Preferably, the or each subscriber transceiver includes channel availability monitoring means for determining the current channel availability of the subscriber transceiver and for passing channel availability data to each of the subscriber interfaces, each of the subscriber interfaces including resource allocation means for allocating a subscriber call to a subscriber transceiver dependent on the channel availability data of the subscriber transceivers of the group.

For ISDN use, one or more of said subscriber interface devices may include multiplexing means for providing PSTN and ISDN access at the subscriber location.

In another aspect, this invention seeks to provide a radio access telecommunication system which provides a subscriber with an increased bandwidth to allow access to high bandwidth services such as ISDN.

Accordingly, in this aspect, this invention provides a radio access system for establishing radio communication between a subscriber location and a base station, said base station including a base transceiver for providing a plurality of radio communication channels between said base station and one or more subscriber locations, and a backhaul for passing signals between said base station and a telecommunications network;

a subscriber interface associated with said subscriber location and including line termination equipment;

at least two subscriber transceivers for establishing respective radio communication channels with said base station transceiver, and means for passing signals between said subscriber transceivers and said subscriber interface device.

In this arrangement, increased bandwidth is achieved by providing the subscriber with a single subscriber interface device which is connected to at least two subscriber transceivers to provide increased bandwidth without requiring a further subscriber interface. In addition the system provides several useful features such as multiple homing, CDMA (spread spectrum) handoff, and the ability to replace, maintain or upgrade the radio transceivers whilst still maintaining a service to the subscriber.

In another aspect, there is provided a method of establishing radio communication between a common base station and a plurality of subscriber locations each having a subscriber interface device, which comprises:

providing said plurality of subscriber locations with a group of one a more subscriber transceivers;

providing said base station with a base transceiver capable of establishing a plurality of radio communication links between said base station and said group of one or more subscriber transceivers and, providing a shared bus for establishing communication between each subscriber interface and said group of subscriber transceivers.

In a further aspect, there is provided a method of establishing radio communication of adjustable bandwidth between a base station having a base transceiver, and a subscriber location, which method comprises:

providing said subscriber location with a subscriber interface device including line termination equipment, connecting at least two subscriber transceivers to said subscriber interface device, and passing data between said base station and said subscriber location selectively via one or more of said subscriber transceivers dependent on the bandwidth of said data.

Whilst the invention has been described above, it extends to any inventive combination set out above or in the following description.

BRIEF DESCRIPTION OF THE DRAWINGS

The invention may be performed in various ways and, by way of example only, certain embodiments will now be described, reference being made to the following drawings, in which.

Figure 1:
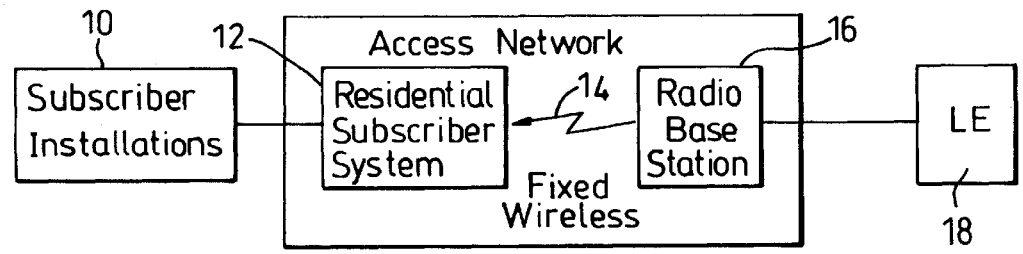
FIG. 1 is a block diagram of a known form of fixed radio access telecommunications system.

Referring initially to FIG. 1, in a typical known fixed radio access telecommunications network, the subscriber installations 10 are connected to a residential subscriber system 1 2 which includes a residential base unit and a residential transceiver unit (not shown in this Figure). The residential subscriber system is connected by means of a radio link 14 to a remote base station 16 which is connected to the PSTN network via a local exchange 18.

Figure 2:
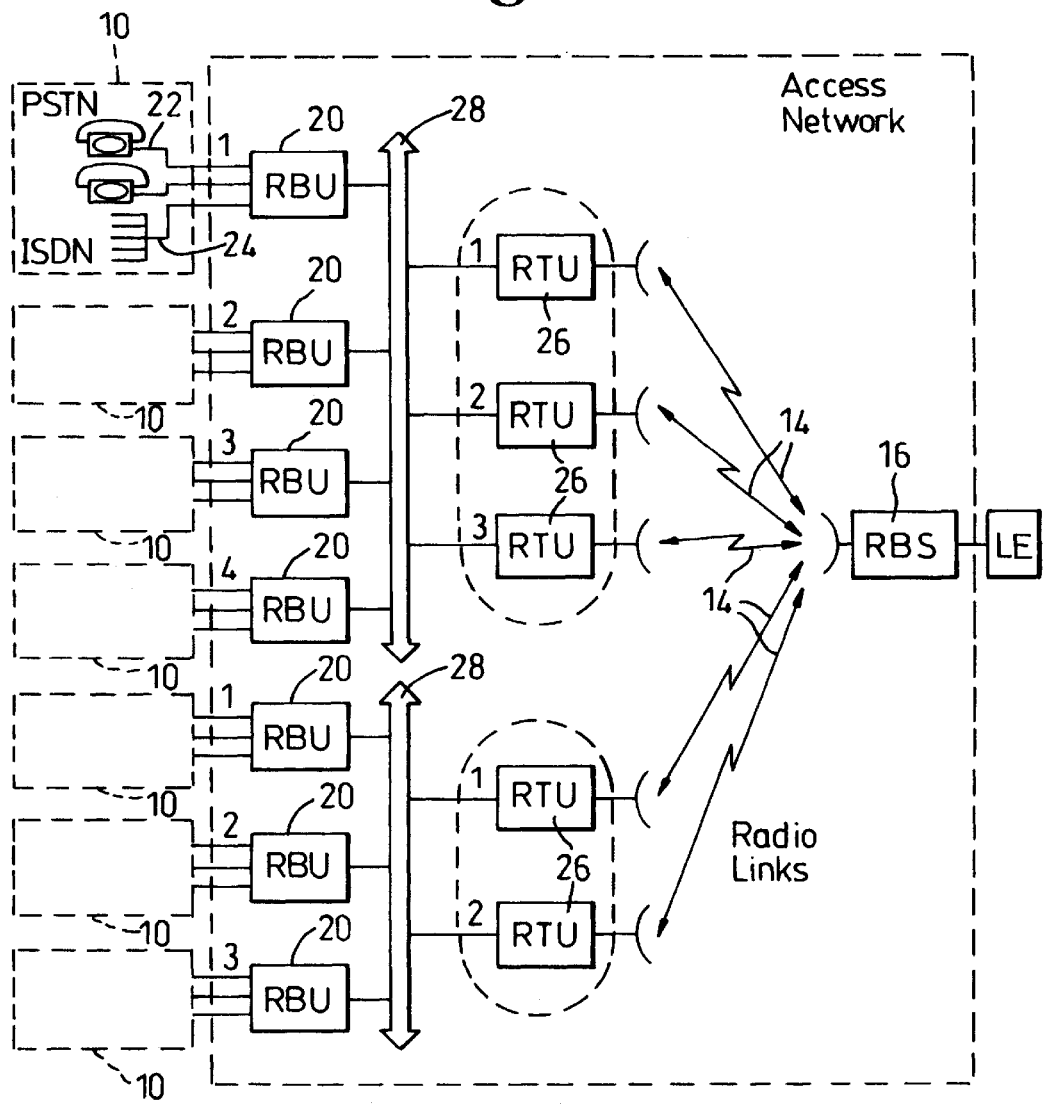
FIG. 2 is a block diagram of a fixed radio access telecommunications system in accordance with a first aspect of this invention, providing a flexible multi-line subscriber system.

Referring now to FIG. 2, in the first aspect of this invention, each subscriber is provided with a residential base unit (RBU) 20 as before which provides PSTN lines 22 and (if required) ISDN lines 24 to the subscriber at the subscriber installation 10. However, instead of connecting the residential base units 20 directly to the residential transceiver units (RTU) 26 on a one-to-one mapping, a group or pool of residential base units 20 from adjacent subscriber installations 10 is connected to a common data bus 28 to which is also connected an associated group or pool of residential transceiver units 26 which communicate in the usual way by radio link 14 with the radio base station, The bus 28 allows any of the residential base units to access one or more of the residential transceiver units 26.

Each residential transceiver unit 26, in this example, is capable of transmitting three channels each of 32 kbit/s to the base station 16. Each residential transceiver unit 26 also determines the current status of each of the three channels and signals their availability to all of the residential base units 20 in the group via the bus 28. When preparing to set up a call, a residential base unit 20 therefore determines the channel availabliy as previously signalled to it from the residential transceiver unit 26 and then passes the signal from the residential base unit 20 at the subscriber installation 10 to a residential transceiver unit 26 having one or more free channels as required. Thus for example to set up two PSTN calls from the subscriber installation, the residential base unit will have two 32 kbit/s ADPCM channels to transmit. These may be allocated to two channels of a single residential transceiver unit 26, thus leaving the third channel free. If a PSTN call is then made from another subscriber installation in the same group, this may be routed by the associated residential base unit 20 to the third channel of the same residential transceiver unit 26, so that the two subscribers (3 PSTN calls) are serviced by a single residential transceiver unit.

Alternatively, if a subscriber with an ISDN basic rate line in use he may require the full 2B+D (144 kbit/s) which is greater than the capacity of one residential transceiver unit. In this instance, the subscriber's residential base unit 20 can allocate one B channel to a first residential transceiver unit 26 (taking up two channels of the unit) and the B+D channels can be transmitted by the three available channels on a further residential transceiver unit $26^1$, $26^{11}$ in the same group. If then another subscriber In the same group wished to make a PSTN call this could be allocated to the first residential transceiver unit 26 so that the two subscribers were served by two residential transceiver units.

Figure 3:
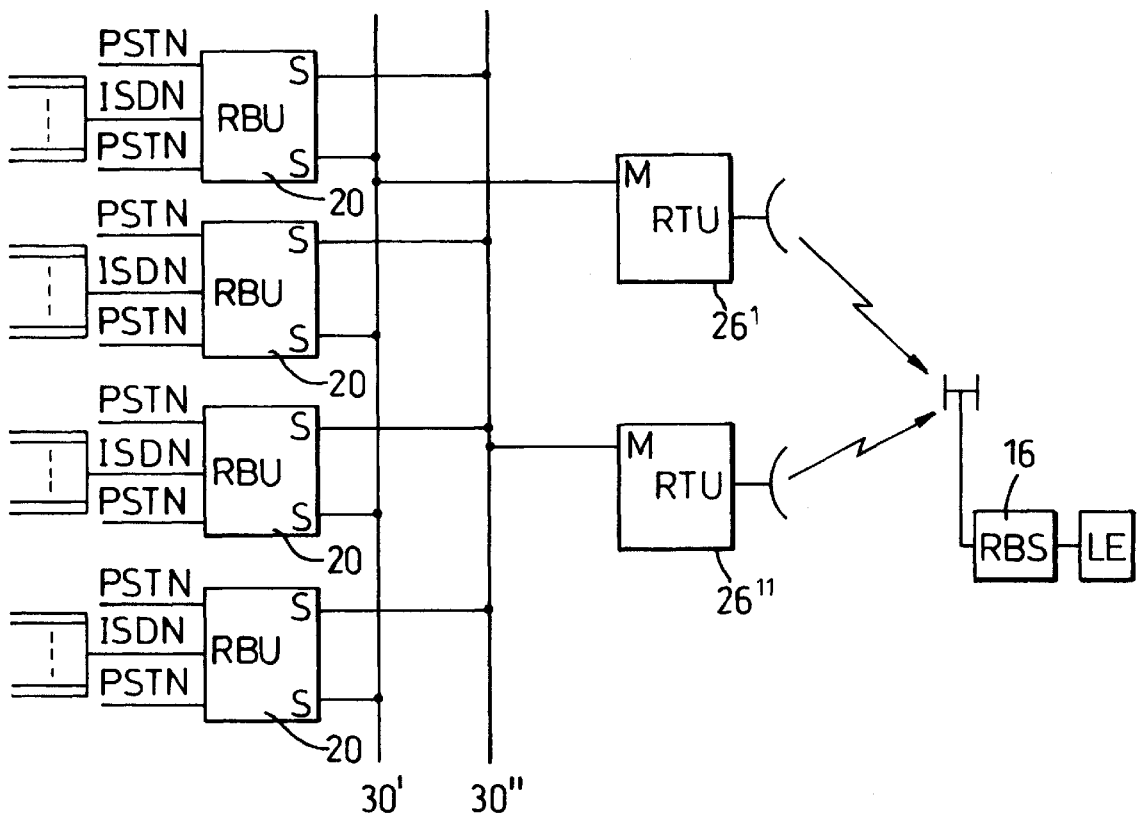
FIG. 3 is a block diagram of a fixed radio access telecommunication system similar to that of FIG. 2 but employing a respective S-Bus connected to each residential transceiver unit.

In a particularly preferred embodiment, the bus 28 connecting the group of residential base units 20 and the group of residential transceiver units 26 could be an S-Bus. This has considerable advantages in terms of the ease with which this solution may be implemented. As shown in the arrangement of FIG. 3, each residential transceiver unit 26 is connected as a master to an associated S-Bus 30', 30'' with the group of residential base units 20 connected as slaves. This arrangement allows the residential transmitter units 26 to share information with the residential base units, using the S-Bus. Alternatively, a single S-Bus could be provided with one residential base unit as master and residential base units as slaves. With existing S-Bus technology, the maximum number of connections to an S-Bus is one master and eight slaves.

In the above arrangements the residential base units 20 also monitor the residential transceiver units 26 and, in the event of a failure such as power loss, loss of radio link, etc., the residential base unit 20 signals this information via an operational residential transceiver unit 26 to the base station 16 so that the fault can be flagged and corrected. The system thus provides distributed decision making rather than requiring a central monitoring point.

Figure 4:
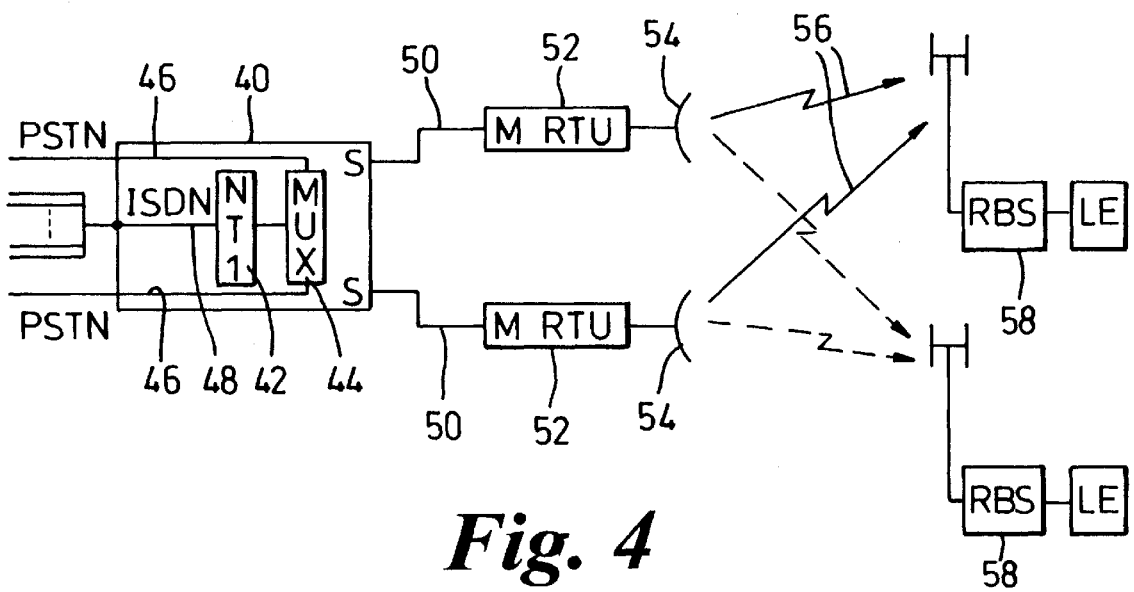
FIG. 4 is a block diagram of a fixed radio access telecommunications system in accordance with a further aspect of this invention, providing increased bandwidth for a subscriber.

Referring now to FIG. 4, in this embodiment, a residential base unit 40 incorporates an NT1 interface 42 and a multiplexer 44. The NTI interface 42 and multiplexer 44 may be as shown in a single unit or they may be separately located. The multiplexer combines two PSTN lines 46 and an ISDN primary rate line (2B+D) 48. From the multiplexer 44, the de-multiplexed signals pass via respective drop cables 50 to two radio transceiver units 52 each having an antenna 54 providing a radio link 56 with one or more base stations 58. Each base station 58 is typically equipped with up to six transceivers each supporting a frequency bearer and each frequency bearer is split into ten time slots using a TDMA modulation scheme, giving a capacity of 60 32 kbit/s time slots.

As in the previous embodiments each residential transceiver unit 52 is operable to set up a radio link with the base station 58 with a capacity of up to 3×32 kbit/s.

This embodiment provides an extremely flexible arrangement whereby the subscriber may be provided with ISDN basic rate (2B+D) service using both radio transceiver units 52. Each B channel requires 64 kbit/s bandwidth and so can be transmitted using two of the 32 kbit/s channels of the residential transceiver units. Alternatively, a 1B+D ISDN service may be provided using one channel of the residential transceiver unit at 80 kbit/s. The arrangement also provides support for D channel packet data services. As noted above, up to two analogue phones (one for each residential transceiver unit) may be provided. Using both the residential transceiver units, a single 2×64 kbit/s unrestricted bearer can be supported.

This arrangement allows the bandwidth available to the subscriber to be greatly increased but also provides several additional benefits. For example, it provides a degree of redundancy and the ability to maintain or upgrade the radio transceiver units. Thus the arrangement may allow one residential transceiver unit to be taken out of service for maintenance or upgrading whilst still providing the subscriber with access to the network via the other radio transceiver unit, albeit at a reduced bandwidth.

Where the capacity allows, the two residential transceiver units may operate in diversity mode so that if there is a problem with one radio link, the traffic is passed via the other radio link. A further possible feature is for the radio transceiver units to be directed towards separate base stations. When the subscriber requests a connection, the system may select an appropriate available channel from the range available taking into account, for example, the bandwidth requested and the availability, capacity, and quality-of-service of channels to the respective base stations.

Furthermore, this arrangement may be used to implement code division multiple access (CDMA) or spread spectrum communication across the various channels.

What is claimed is:

1. A radio access system for establishing radio communication between a base station and a plurality of subscriber locations, in a fixed radio access telecommunications network, said base station including a base transceiver for providing a plurality of radio communication links between said base station and respective subscriber locations, and a backhaul for passing signals between said base station and a telecommunications network;

a group of two or more subscriber transceivers of given capacity associated with said plurality of subscriber locations;

a respective interface device associated with each subscriber location and including line termination equipment, and a data bus connecting each said subscriber transceiver with each subscriber interface device, wherein said subscriber transceivers and said subscriber interface devices may be connected in other than one-to-one mapping.

2. A radio access system according to claim 1, wherein said data bus comprises one or more shared buses.

3. A radio access system all to claim 2, wherein said one or more shared data buses comprise an S-Bus.

4. A radio access system according to claim 3, wherein said data bus comprises a respective S-Bus connected to a given subscriber transceiver and each of said subscriber interface devices.

5. A radio access system according to claim 1, including respective channel availability monitoring means associated with the or each subscriber transceiver for monitoring the channel availability of the subscriber transceiver and for passing channel availability data to the subscriber interfaces, each of said subscriber interfaces having resource allocation means for allocating a subscriber call to a subscriber transceiver dependent on the channel availability data from the transceivers of the group.

6. A radio access system according to claim 1, adapted to allow ISDN use, wherein one or more of said subscriber interface devices include multiplexing means for providing PSTN and ISDN lines at the subscriber location.

7. A radio access system for establishing radio communication between a subscriber location and a base station, said base station including a base transceiver for providing a plurality of radio communication channels between said base station and one or more subscriber locations, and backhaul means for passing signals between said base station and a telecommunications network;

a subscriber interface associated with said subscriber location and including line termination equipment;

at least two subscriber transceivers for establishing respective radio communication channels with said base transceiver, and means for passing signals between said subscriber transceivers and said subscriber interface device.

8. A method of establishing radio communication between a common base station and a plurality of subscriber locations each having a subscriber interface device, which comprises:

providing said plurality of subscriber locations with a group of one a more subscriber transceivers;

providing said base station with a base transceiver capable of establishing a plurality of radio communication links between said base station and said group of one or more subscriber transceivers and, providing a shared bus for establishing communication between each subscriber interface and said group of subscriber transceivers.

9. A method of establishing radio communication of adjustable bandwidth between a base station having a base transceiver, and a subscriber location, which method comprises:

providing said subscriber location with a subscriber interface device including line termination equipment, connecting at least two subscriber transceivers to said subscriber interface device, and passing data between said base station and said subscriber location selectively via one or more of said subscriber transceivers dependent on the bandwidth of said data.

10. A radio access system for establishing radio communication between a base station and a plurality of subscriber locations in a radio access telecommunications network, said base station including a base transceiver for providing a plurality of radio communication links between said base station and respective said subscriber locations, and a backhaul for passing signals between said base station and a telecommunications network;

a group comprising two or more subscriber transceivers of given capacity associated with said plurality of subscriber locations;

a respective interface device associated with each said subscriber location and including line termination equipment, and a data bus connecting each said subscriber transceiver with each said subscriber interface device, wherein said subscriber transceivers and said subscriber interface devices may be connected in other than a one-to-one mapping.

11. A radio access system according to claim 10, wherein said subscriber locations are fixed.

12. A radio access system for establishing radio communication between a base station and a plurality of subscriber locations in a radio access telecommunications network, said base station including a base transceiver for providing a plurality of radio communication links between said base station and respective subscriber locations, and a backhaul for passing signals between said base station and a telecommunications network;

a group of two or more subscriber transceivers, each said subscriber transceiver capable of transmitting one or more radio communication channels to said base transceiver;

a respective interface device associated with each said subscriber location and including line termination equipment, and means for allocating one or more of said radio communication channels of said subscriber transceiver group to any of said subscriber interface devices.

13. A radio access system according to claim 12, wherein said allocating means is dependent upon the bandwidth of data to be passed between said base station and said subscriber interface device.

14. A radio access system according to claim 12, wherein said subscriber locations are fixed.

15. A radio access system for establishing radio communication between a base station having a base transceiver, and a subscriber location having a subscriber interface device including line termination equipment, said radio access system comprising:

means for connecting at least two subscriber transceivers to said subscriber interface device; and means for passing data of variable bandwidth between said base station and said subscriber location selectively via one or more said subscriber transceivers, said selection being dependent upon the bandwidth of said data.

16. A radio access system according to claim 15, wherein said means for passing data comprises one or more shared buses.

17. A radio access system according to claim 16, wherein said one or more shared data buses comprise an S-bus.

18. A radio access system according to claim 17, wherein said data bus comprises a respective S-bus connected to a given subscriber transceiver and each of said subscriber interface device.

19. A radio access system according to claim 15, including respective channel availability monitoring means associated with each said subscriber transceiver for monitoring the channel availability of the subscriber transceiver and for passing channel availability data to the subscriber interfaces, each of said subscriber interfaces having resource allocation means for allocating a subscriber call to a subscriber transceiver dependent on the channel availability data from the transceivers of the group.

20. A radio access system according to claim 15, adapted to allow ISDN use, wherein one or more of said subscriber interface devices include multiplexing means for providing PSTN and ISDN lines.

21. A method according to claim 9, wherein said means for passing data comprises one or more shared buses.

22. A method according to claim 21, wherein said one or more data buses comprise an S-Bus.

23. A method according to claim 22, wherein said data bus comprises a respective S-Bus connected to a given subscriber transceiver and each of said subscriber interface devices.

24. A method according to claim 9, adapted to allow ISDN use, wherein one or more of said subscriber interface devices are multiplexed for providing PSTN and ISDN lines at the subscriber location.

25. A method of establishing radio communication of adjustable bandwidths between a base station having a base transceiver, and a subscriber interface device including line termination equipment, which method comprises:

connecting at least two subscriber transceivers to said subscriber interface device, and passing data between said base station and said subscriber interface device selectively via one or more of said subscriber transceivers dependent on the bandwidth of said data.

26. A method according to claim 25, wherein said data is passed via one or more shared buses.

27. A method according to claim 26, wherein said one or more data buses comprise an S-Bus.

28. A method according to claim 27, wherein said data bus comprises a respective S-Bus connected to a subscriber transceiver and each of said subscriber interface devices.

29. A radio access system for establishing radio communication between a base station having a base transceiver, and a subscriber interface device including line termination equipment, said radio access system comprising:

means for connecting at least two subscriber transceivers to said subscriber interface device, and means for passing data of variable bandwidths between said base station and said subscriber interface device selectively via one or more said subscriber transceivers, said selection being dependent upon the bandwidths of said data.

30. A radio access system according to claim 29, wherein said means for passing data comprises one or more shared buses.

31. A radio access system according to claim 30, wherein said one or more shared data buses comprise an S-Bus.

32. A radio access system according to claim 31, wherein said data bus comprises a respective S-Bus connected to a given subscriber transceiver and each of said subscriber interface devices.

33. A radio access system according to claim 29, including respective channel availability monitoring means associated with each said subscriber transceiver for monitoring the channel availability of the subscriber transceiver and for passing channel availability data to the subscriber interfaces, each of said subscriber interfaces having resource allocation means for allocating a subscriber call to a subscriber transceiver dependent on the channel availability data from the transceivers of the group.

34. A radio access system according to claim 29, adapted to allow ISDN use, wherein in one or more of said subscriber interface devices include multiplexing means for providing PSTN and ISDN lines.

* * * * *